(12) United States Patent
Flores et al.

(10) Patent No.: US 6,370,498 B1
(45) Date of Patent: Apr. 9, 2002

(54) APPARATUS AND METHODS FOR MULTI-LINGUAL USER ACCESS

(76) Inventors: Maria Ruth Angelica Flores, Abrams 8D Escondido Village, Stanford, CA (US) 94305; Sanjay Dabral, 1593 Pebble Beach Ct., Milpitas, CA (US) 95035

( * ) Notice: Subject to any disclaimer, the term of this patent is extended or adjusted under 35 U.S.C. 154(b) by 65 days.

(21) Appl. No.: 09/094,886

(22) Filed: Jun. 15, 1998

(51) Int. Cl.[7] .............................................. G06F 17/28
(52) U.S. Cl. ........................................ 704/3; 707/536
(58) Field of Search .............................. 704/1, 2–7, 8; 707/2, 4, 6, 530, 536; 379/52, 67, 88, 88.05; 84/610

(56) References Cited

U.S. PATENT DOCUMENTS

| | | | |
|---|---|---|---|
| 4,365,315 A | 12/1982 | Jamnik ........................... 704/8 |
| 4,566,078 A | 1/1986 | Crabtree ......................... 704/8 |
| 4,595,980 A | 6/1986 | Innes .............................. 704/8 |
| 4,615,002 A | 9/1986 | Innes .............................. 704/8 |
| 4,731,735 A | 3/1988 | Borgendale et al. ........... 704/8 |
| 4,870,610 A | 9/1989 | Belfer ............................. 704/8 |
| 5,146,587 A | 9/1992 | Francisco .................... 714/57 |
| 5,148,541 A | 9/1992 | Lee et al. ...................... 707/2 |
| 5,155,849 A | 10/1992 | Westfall et al. ................ 704/2 |
| 5,157,606 A | 10/1992 | Nagashima ..................... 704/8 |
| 5,225,981 A | 7/1993 | Yokogawa ...................... 704/9 |
| 5,257,366 A | 10/1993 | Adair et al. .................... 707/4 |
| 5,375,164 A | 12/1994 | Jennings ....................... 379/88 |
| 5,412,712 A | 5/1995 | Jennings ....................... 379/88 |
| 5,416,903 A | 5/1995 | Malcolm ......................... 704/8 |
| 5,428,772 A | 6/1995 | Merz .............................. 704/8 |
| 5,434,776 A | 7/1995 | Jain ................................ 704/8 |
| 5,440,482 A | 8/1995 | Davis ............................. 707/6 |
| 5,442,782 A | 8/1995 | Malatesta et al. .............. 707/4 |
| 5,475,733 A | 12/1995 | Eisdorfer et al. ............. 379/52 |
| 5,486,111 A | 1/1996 | Watkins ......................... 704/2 |
| 5,499,335 A | 3/1996 | Silver et al. ................... 704/8 |
| 5,523,946 A | 6/1996 | Kaplan et al. ................. 704/8 |
| 5,524,137 A | 6/1996 | Rhee ............................ 379/67 |
| 5,546,304 A | 8/1996 | Marschner et al. ............ 704/2 |
| 5,548,509 A | 8/1996 | Takagi ............................ 704/2 |
| 5,555,169 A | 9/1996 | Namba et al. ................. 704/9 |
| 5,570,134 A | 10/1996 | Hong ............................. 704/2 |
| 5,572,643 A | 11/1996 | Judson ........................ 704/218 |
| 5,583,761 A | 12/1996 | Chou ............................. 704/8 |
| 5,594,490 A | 1/1997 | Dawson et al. ................ 348/6 |
| 5,635,657 A | 6/1997 | Lee et al. ..................... 84/610 |
| 5,768,581 A | * 6/1998 | Cochran ..................... 395/615 |
| 5,787,443 A | * 7/1998 | Palmer ....................... 707/202 |

* cited by examiner

Primary Examiner—Patrick N. Edouard
(74) Attorney, Agent, or Firm—Blakely, Sokoloff Taylor & Zafman

(57) ABSTRACT

An apparatus and method for the multi-lingual creation and retrieval of a work from a database storing multiple texts and/or translations of works in a variety of formats. A user can create and retrieve multiple translations of a work and may choose to have the multiple texts and/or translations presented in different formats. For example, the user may choose to have a document displayed textually in two separate languages, or in text in one language and in audio in a second language.

20 Claims, 6 Drawing Sheets

FIG. 1

| N | Number of translations required to allow a direct comparison between any 2 of N languages using the traditional method | Number of translations required to allow direct comparison between any 2 of N languages using the present invention |
|---|---|---|
| 2 | 1 | 1 |
| 3 | 3 | 2 |
| 4 | 6 | 3 |
| 5 | 10 | 4 |
| 6 | 15 | 5 |
| 7 | 21 | 6 |
| 8 | 28 | 7 |
| 9 | 36 | 8 |
| 10 | 45 | 9 |
| 11 | 55 | 10 |
| 12 | 66 | 11 |
| 13 | 78 | 12 |
| 14 | 91 | 13 |
| 15 | 105 | 14 |
| 20 | 190 | 19 |
| ⋮ | ⋮ | ⋮ |

APPARATUS AND METHODS FOR MULTI-LINGUAL USER ACCESS

BACKGROUND OF THE INVENTION

1. Field of the Invention

This invention relates generally to the field of multi-lingual data processing and retrieval. More specifically, this invention relates to an apparatus and method for allowing a user to access and create a particular work in multiple languages and a variety of formats.

2. Description of the Related Art

As the international world becomes more close-knit, the need for and value of multi-lingual material is rapidly growing. Currently, people interested in reading a document in more than one language are limited to dual language translation books. Many foreign language teaching aids employ such a book by having the text of the first language presented adjacent to the corresponding text of the second language on each page. U.S. Pat. No. 5,486,111 ('111 patent) describes such a limiting teaching aid.

The teaching aid described in the '111 patent displays the original text, a word-for-word translation, and a translation following the normal rules of syntax and grammar. For example, a Spanish/English workbook would have a line in Spanish with both the literal and contextually correct English translations below or beside the Spanish line. In this manner, English speaking students attempting to learn Spanish have a method of comparing the two different languages on a line by line basis as they become more familiar with the new language. With the '111 patent, however, a reader is limited to the translation combinations provided by each publication. The reader does not have a choice of languages employed by the translating teaching aid. Thus, a reader's only option may be Machine Translation. Such an automatic translation service, provided by companies such as Systran, translates the text with a dictionary like reference source and with grammatical rules. However, only an 80% approximate accuracy may typically be expected in a translation of a general text. With more complex texts, such as poetry or jokes, more accurate translations are only a dream even as perceived in the future.

Although the dual translation books are very helpful as foreign language teaching aids, the amount of time and effort required to prepare multiple correlating translations of entire documents limits their availability for other uses both in the scope of material covered and the languages in which any given material is made available. Because of this, many publications allowing a comparison between two languages are available only in the most widely used languages and only for commonly referenced material (e.g. English and German, German and French, . . . , but not Latin and Fijian, or Latin and Samoan).

The lack of sufficient translations and combinations of translations is particularly evident in countries around the globe where many different languages and dialects are spoken. Although it may be possible to obtain translations from numerous less spoken languages into widely spoken languages, such as English, good or reasonable translations between two less widely spoken languages are difficult if not impossible to find. For example, for a reader to compare a work published in less used Language A (perhaps, his or her native language) with an unfamiliar less used Language B, the reader often must work through a widely used Language C (Language C "links" Languages A and B). To compare Language A to Language B, the reader must obtain a Language A to Language C translation and also a Language C to Language B translation since it is typically impossible to find a direct translation from Language A to Language B. Note that the reader must be familiar with Language C for a successful "link" between Language A and Language B. Thus, the scope of material and number of works available to a reader interested in comparing two less widely used languages is dramatically limited to works that have been translated from the widely spoken Language C into each of the less spoken Languages A and B.

A specific example will more clearly illustrate the problem. A document made available in three languages, such as English, French, and German, and presented in the above described direct comparison method of the '111 patent requires three publications: a publication having an English to French translation, a publication having an English to German translation, and a publication having a French to German translation. Adding a language, such as Japanese, requires more than one additional publication. Instead, six publications are now required for direct comparisons between any two of the four languages: an English/French translation, an English/German translation, an English/Japanese translation, a French/German translation, a French/Japanese translation, and a German/Japanese translation. Further, for a single document to be published allowing comparisons between any two of ten languages, forty-five separate publications would be required to cover all possible language combinations of the document. See the table of FIG. 1 for the number of translations required for a direct comparison of a text in any 2 of n number of languages.

Monolingual or multi-lingual users seeking a comparison of material in multiple languages are often unsuccessful in finding publications containing the desired material in a specific language combination, particularly when the desired material is not widely accessed and/or one or both of the languages are not widely spoken. Thus, a system comprising a foreign language database that allows a user to create a custom-made publication suited to the user's own needs by allowing the user to choose the languages a document is displayed in is desirable. Such a database may be networked or media based.

Some foreign language databases do exist, but none are known to allow a user to access a document simultaneously in multiple languages. For example, some software programs, including both operating systems and application programs, are available in multiple language versions and allow the user to choose the language used for the display. Such software programs store the application program in one of the provided languages as a default, but give the user a choice of language for operation of the program when the program is installed. Once the language is selected, all future operations of the program will progress in the selected language until the language selection is changed. In a similar manner, a single piece of software can be sold for use in multiple markets encompassing several different languages. This eliminates the need for independent versions of the same software for each separate language.

Some specific examples of software programs using a database allowing the user to choose the program language include U.S. Pat. Nos. 4,365,315 and 5,583,761. U.S. Pat. No. 4,365,315 describes a system allowing an operator of computer-controlled equipment to choose the language the computer will display instructions and information regarding the system conditions. Similarly, U.S. Pat. No. 5,583,761 describes an Application Program Language Translator which allows application programs involving user interfacing to be displayed in a language selected by the user.

Other data processing systems allow concurrent access to a database by multiple users with each user able to communicate with the database (access documents, insert information, etc.) in a different language. An example is seen in the database described in U.S. Pat. No. 5,442,782. When initially accessing the database described in the '782 patent, each user selects a preferred language and from then on all information retrieved from and submitted to the database by the user is in the preferred language. A linkage and translation system within the database ensures that all the related versions (i.e. the other language translations of the accessed document) of the modified documents within the database system are updated to reflect the changes entered by the user in his preferred language. However, as with the above operating systems and application software programs, each user has to use a single language at any given time as the user is engaging and communicating with the database.

Foreign language databases are also often used for translation purposes. For example, the user can enter a word or phrase in one language, then choose a second language, and the program will "translate" the word or phrase by searching the database and finding its equivalent in the second language. The same such type of database can be used as a foreign language dictionary. The user enters a word in a first language, selects the second language, and the definition is displayed in the second language. However, this scheme does not allow a user to view an entire work in multiple languages simultaneously. Instead, the translation capabilities are generally limited to individual words and/or phrases. Additionally, translation programs typically provide a literal translation rather than a closer contextual translation. For example, poetry, humor in jokes, philosophy, riddles, ethnographies, recipes, legends, oral histories, rhymes, and particularly idioms are generally beyond the reach of such automatic translation systems. It would be advantageous if a user could access and create a work in multiple languages with each translated or user created piece maintaining more of the spirit meant, the meaning and the content of the original work. In other words, works of poetry, philosophy, humor of jokes, riddles, ethnographies, recipes, legends, oral histories, rhymes, and particularly idioms are beyond the reach of such automatic translation systems. Thus, the approach to maintain more of the spirit meant, the meaning and the content extends and creates the contextual meaning beyond just a word per word translation.

It is appreciated that a system allowing a user to access and create a foreign language database to obtain and make a particular work in multiple languages simultaneously would be desirable. This type of system would be beneficial to many users including students of many disciplines and monolingual and multi-lingual users attempting to find or create a particular work for archival or content comparison in multiple languages, particularly if one of the languages was less used, making it difficult to find publications of works in that particular language.

SUMMARY OF THE INVENTION

The present invention describes an apparatus and method for allowing a user to access and create a database for the retrieval or development of a particular work (for example, poetry, jokes, philosophy, riddles, rhymes, recipes, ethnographies, legends, oral histories, idioms, etc.) in multiple languages. A database stores multiple translations of a work, including a first presentation of the work in a first language and a second presentation of the work in a second language. An accessing and creation device is coupled to the database and is used to retrieve and construct the first and second presentations of the work from the database.

The database stores translations of documents in multiple languages and a variety of formats, including written text, audio sound tracks, and video imagery. A user can access and create the database to simultaneously retrieve or make multiple translations for the contextual content of a particular work. Further, the user can choose to have the multiple translations presented in different multi-media's and mediums. For example, the user may choose to have a work displayed in a written text in two or more separate languages, or in text in one language and in audio in a separate language.

DESCRIPTION OF THE DRAWINGS

FIG. 1 is a table showing the number of translations required for a direct comparison of a text in any 2 of n number of languages.

DETAILED DESCRIPTION OF THE INVENTION

The present invention is a system and method for allowing a user to access and create a database for the multilingual retrieval of works. Generally, the retrieved works are presented on a user interface, such as a display screen and/or an audio speaker. The following description sets out numerous specific details to provide a more thorough understanding of the present invention. However, one skilled in the art will appreciate that the present invention may be practiced without these specific details. In other instances, this description does not describe well known features and techniques in detail, such as database accessing software, computer network systems, and the Internet, in order not to obscure the present invention.

Figure 2:
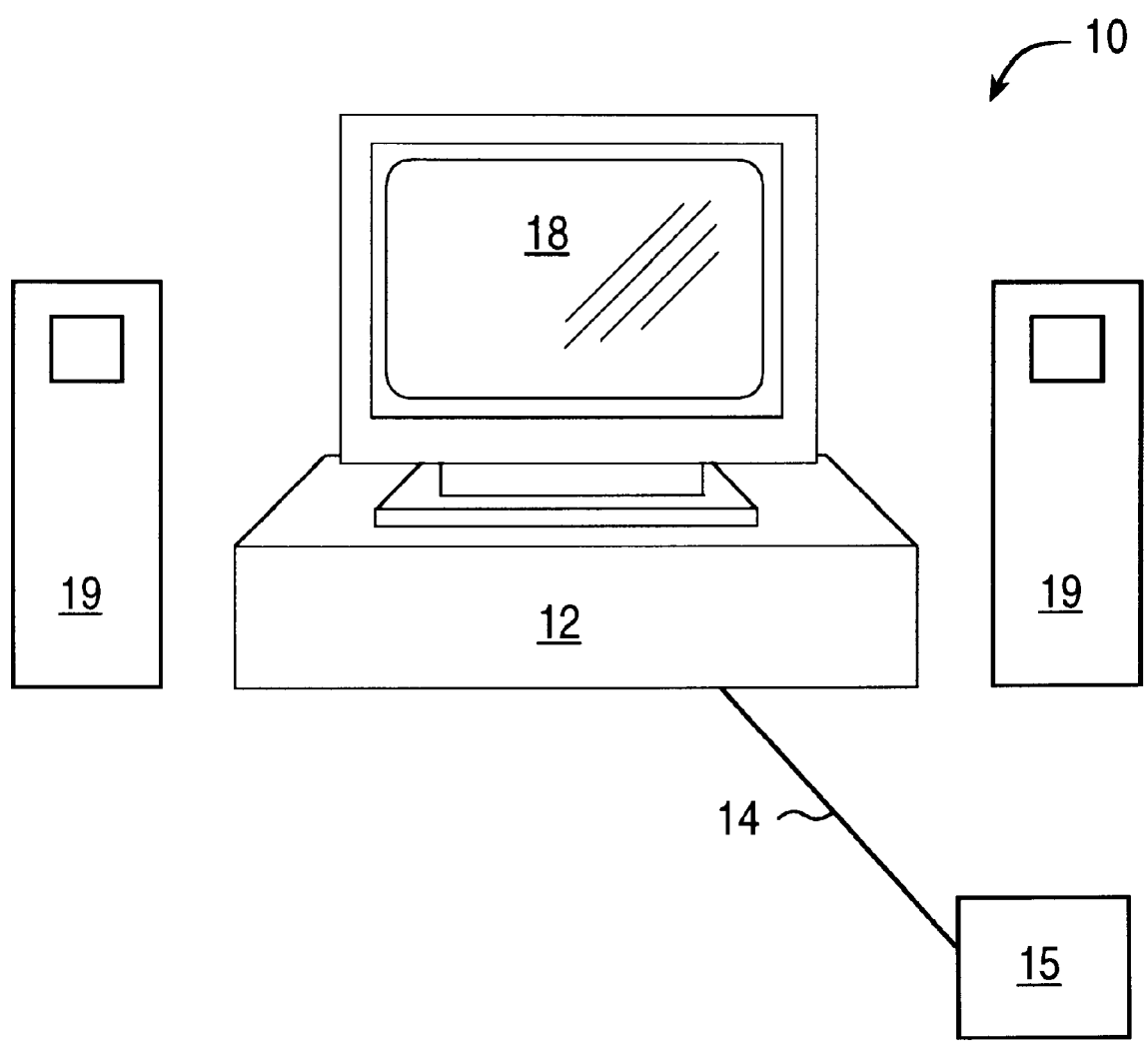
FIG. 2 illustrates multi-language retrieval system of the present invention.

The present invention comprises a technique (or scheme) for allowing a particular work to be accessed or created in multiple languages. Generally, a computer (or processing) system is utilized to practice the present invention. Although a variety of computer systems can be used, one example is noted in FIG. 2. Typically, the computer system 10 comprises a processing element, which is referred to as a processor or central processing unit (CPU) 12; a user interface, such as a monitor or display 18; audio speakers 19; some form of external storage medium 15; and an interconnection 14 for coupling the external storage medium 15 to the CPU 12. The interconnection 14 can comprise any one of several different communication links such as a bus, a modem, a network system, or a link to the Internet. The type of interconnection used, however, will depend on the medium 15.

Figure 3:
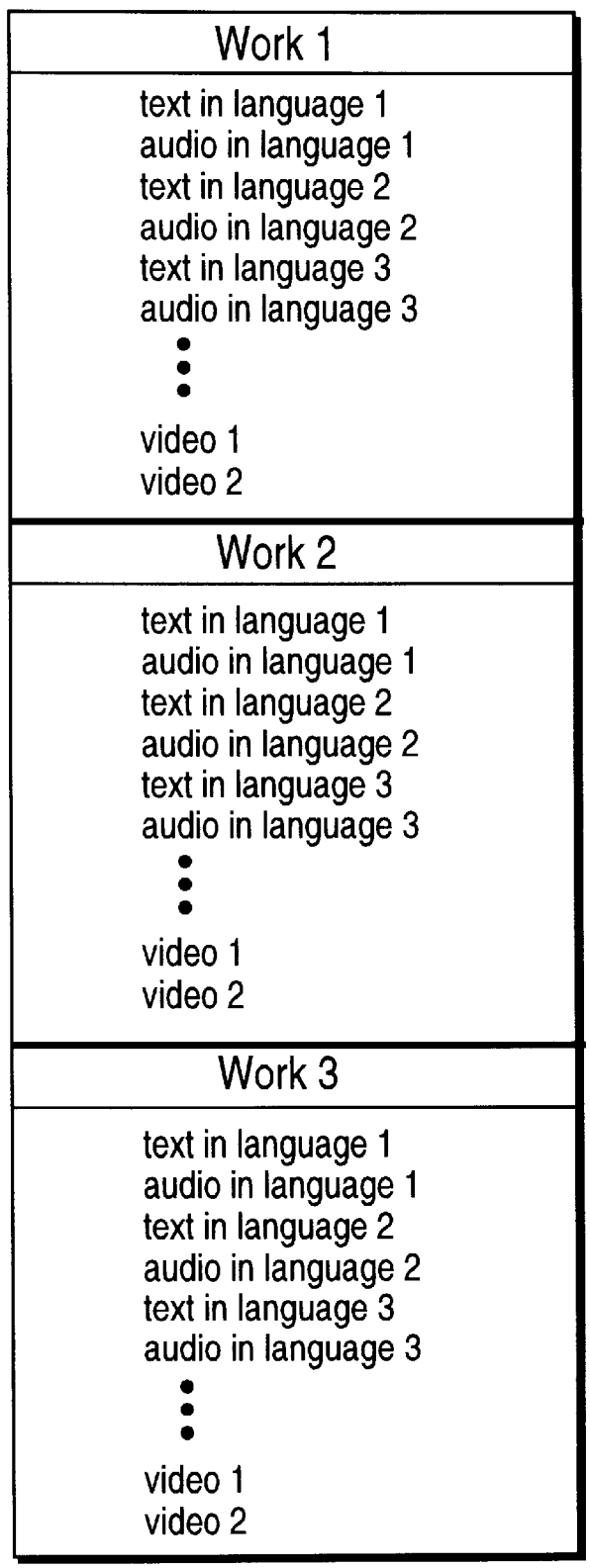
FIG. 3 illustrates the foreign language database of the present invention.

In the present system, the storage medium 15 comprises a database 16 (see FIG. 3) which stores translations of works in multiple languages and a variety of formats, including written text, audio recordings, and video imagery. The database 16 itself may be stored on a magnetic media (floppy and hard disks), optical media (compact disks), solid state media (RAM), or may be accessed via a modem, network system, or the Internet. The interconnection 14 is the communications link between the system user and the database. To retrieve a document from the database 16, the user inputs a selection which is communicated to the database via the interconnection 14. Any one of several software programs currently available may be used to retrieve or create the desired document at the user's signal, with the accessing program or device made part of the database, or specific programs may be developed and incorporated into the database. Once the desired information is retrieved from the database 16, it is presented at the display 18 and/or speakers 19 for the user.

The information within the database may include material such as literary and non-literary works (i.e. novels, short stories, poems, folk stories, nursery rhymes, riddles, jokes, etc.), songs, news stories, movies, games, historical documents, instructional documents, etc. Generally, the information is textual, but it can also be interactive and/or with audio, graphic or video (such as motion video). Each piece of material is not only translated but the images also correlate with multiple languages and can be stored in the database. Some material already exists, for example *Readers Digest* and other such international magazines and newspapers are already published in multiple languages, and once collected may be quickly integrated into the system.

Figure 4:
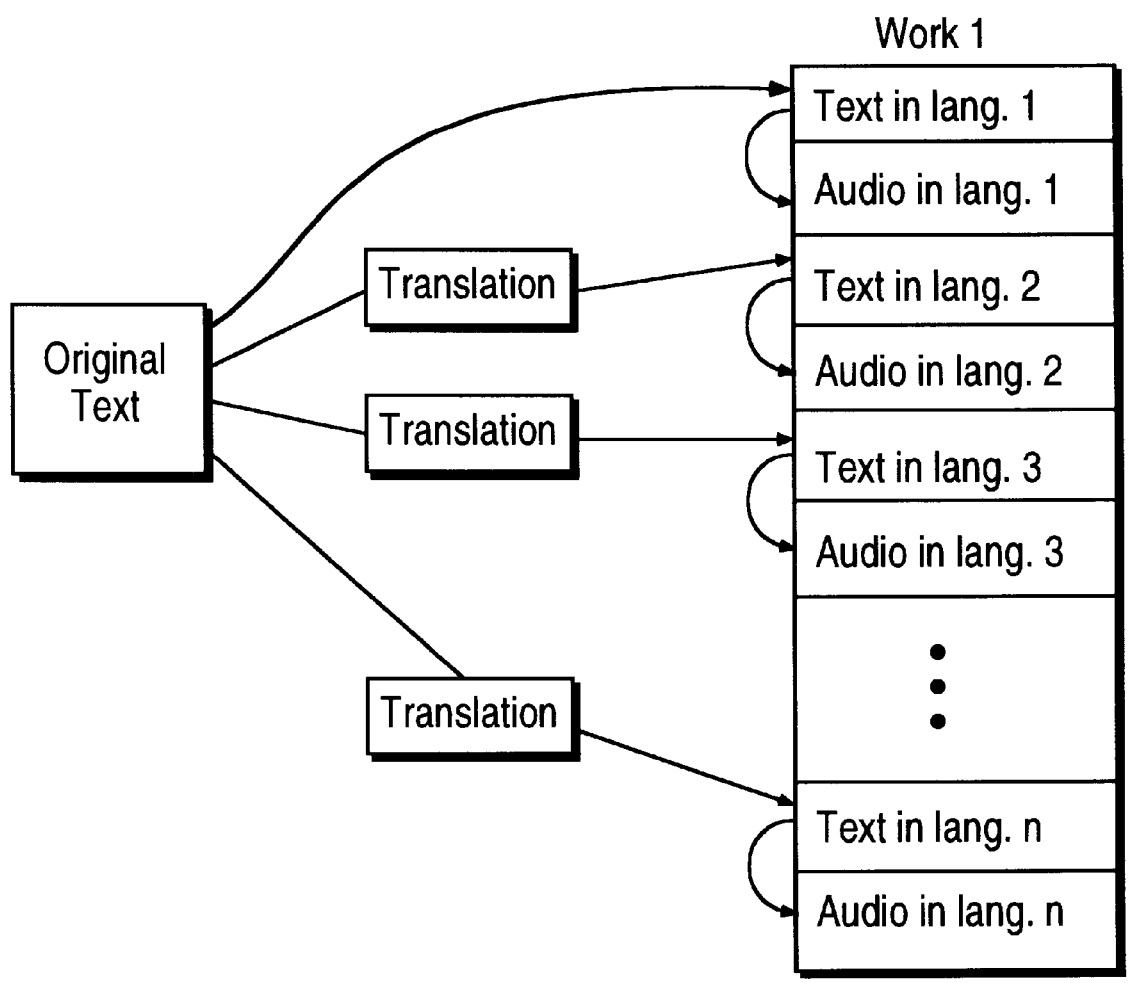
FIG. 4 illustrates the method involved in creating the database of the present invention.

The database itself is created in the following manner (See FIG. 4). Assuming the original work is a written text, it is stored within the database as "text of language 1". An audio sound track of the work in the original language (language one) is recorded from a reading of the original work's written text and stored in the database as "audio of language 1." The audio can be the author's own voice recital. This is particularly useful with poetry and created works to achieve the more exact mood, tone, and meaning.

Next, a translation of the text of the original work into a second language is created. The second language translation is not a literal translation but instead is a translation following the traditional rules of syntax and grammar of the second language while retaining the closest content, context, tone, style, and meaning of the primary work. As with language one, an audio sound track of the work in language two is recorded from a reading of the language two written text and is then stored in the database. Both the text and audio can be cross-linked to other information (e.g. a dictionary, thesaurus, maps, voice(s), music).

A translation is then made of the original work into language three. The third language translation is also not a literal translation of either the original work or the second language translation, but instead is a translation following the traditional rules of syntax and grammar of the third language while maintaining the meaning and style of the primary work. As with languages one and two, an audio soundtrack of the work in language three is recorded from a reading of the language three written text and is then stored in the database. The process can be continued for multiple languages.

In the preferred embodiment, each translation conveys the sense and contextual meaning of the original work rather than being a literal translation. In this manner, each translation of a work is a closer equivalent to the other translations of that same work in other languages. This method of extending translation to a more contextual meaning eliminates the need for direct word per word translations between every possible combination of languages which was the obstacle limiting the number of bilingual publications. (Recall the example in the Background Section where 45 translations were required to allow for a direct translation comparison between any two of ten languages). Instead, translations that accurately reflect the meaning and context conveyed by the primary work are provided in each language stored in the database. Thus, when a reader accesses any two translations of a material, the documents displayed are not a direct translation between the two languages chosen, but rather each is a close contextual translation from the original language of the material. It would be possible to create a database containing direct translations between each possible combination of languages for each material. Such a type of database, however, would be limited in the amount of material it could contain and the foreign language translations it could offer due to the volume of direct translations required to allow direct translation comparisons.

Along with the textual and audio translations of the work in the multiple languages, a motion video representative of the original work can also be stored in the database. Typically, the motion video will be a dramatic presentation of some kind related to the work. A second motion video, however, might involve a presentation of the original work in sign language. Since the motion video, regardless of whether it is a dramatic presentation or a sign language interpretation of the original work, is independent of the individual languages, there are multiple motion videos tied to the text and audio translations of each language.

A few specific examples will illustrate how the present invention utilizes the above described database (See FIGS. 4A and 4B). A user will access the database, either by loading the database onto the computer with a magnetic or optical medium or by retrieving it via a system network or the Internet. The user will first select a particular work to view, generally chosen from a provided menu listing the works available on the database. Typically, once a work is selected, the user will be provided with a list of languages that the work is available in. The user may also be given a choice of formats, such as written text, audio sound track, and motion video, in which the work is available. Once the user has made selections, the access program will retrieve the selected material from the database and present it at the user's display monitor and/or speakers. For example, a user might choose the Shakespearean play of Hamlet and indicate that the languages the user would like to read the play in are Japanese and Portuguese. The software accesses the database, retrieving and then displaying for the user's view translations of Hamlet in both Japanese and Portuguese.

Figure 5A:
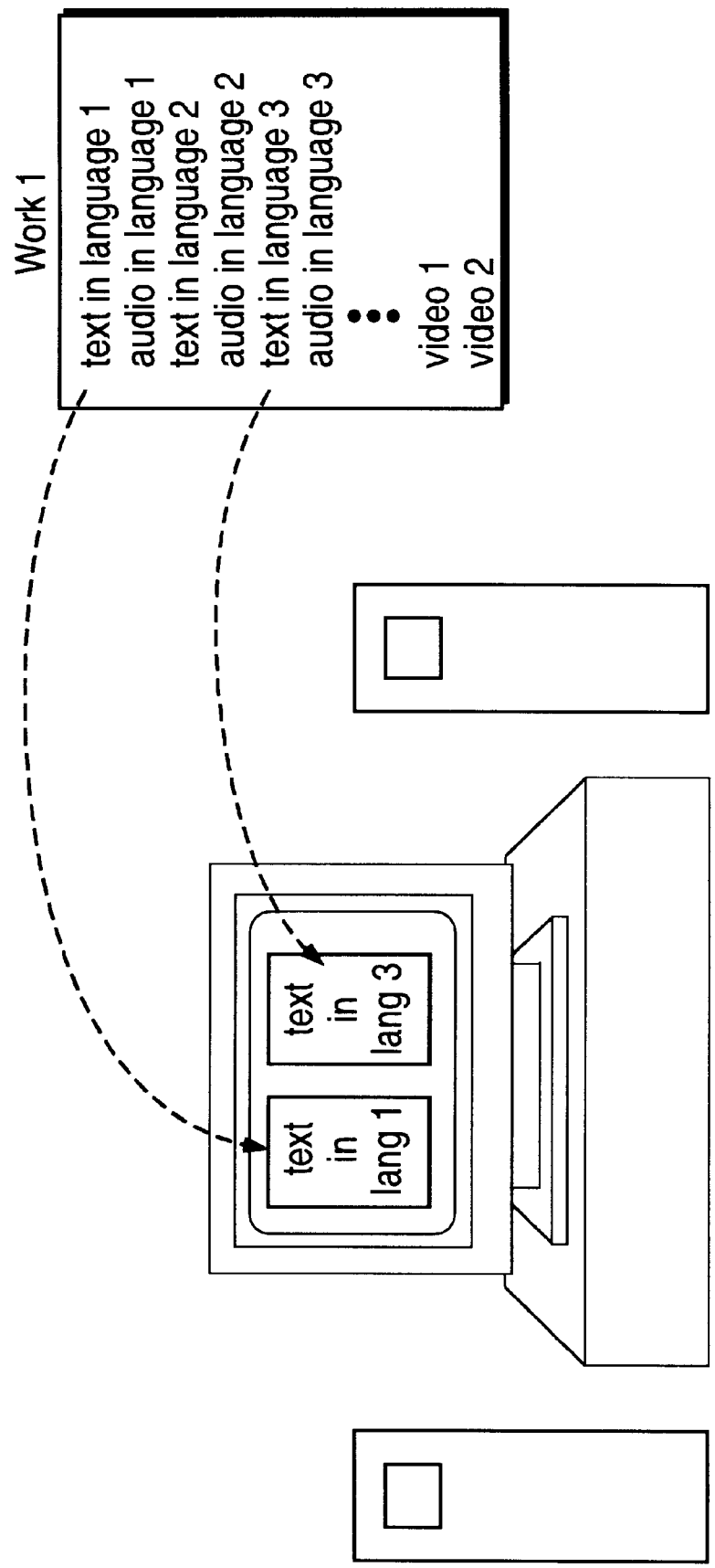
FIG. 5A illustrates a display of the present invention in which a material is presented in the written text of two languages.

A user will generally choose to view a work in the written text of two or more languages presented adjacently (See FIG. 5A). Once the user has selected the work the user wishes to view and has chosen the languages the user wishes to view the work in, the accessing program or device will retrieve the chosen texts and display them on the user's monitor. This type of adjacent text presentation may be particularly helpful to users or students familiar with one language and attempting to learn or strengthen their reading and/or writing skills or understanding in a second language.

Alternatively, however, a user may also choose to obtain the work in a variety of other formats, such as audio, graphic, or video presentations. For example, a user may choose to view the written text of a work in a first language and hear an audio recording of that same work in a second language. Once the user has selected the work to view and has chosen the languages and formats to view the work in, the accessing program or device will retrieve the chosen formats and present them at the user's display with or without audio speakers. The written text and audio recording combination will be beneficial to many users with multiple interests, including users wishing to become more proficient with the specific pronunciation and inflection associated with a particular language when spoken. The video can provide additional contextual clues to a beginning reader. The speed of the audio recording can be made adjustable to more conveniently fit the individual's reading skill, speed and type or level of engagement. This allows the system to be tailored to suit individual users' needs if at different stages of the learning, engagement, or production process. One method to implement this would be to have the same work available in various audio styles and speeds.

Figure 5B:
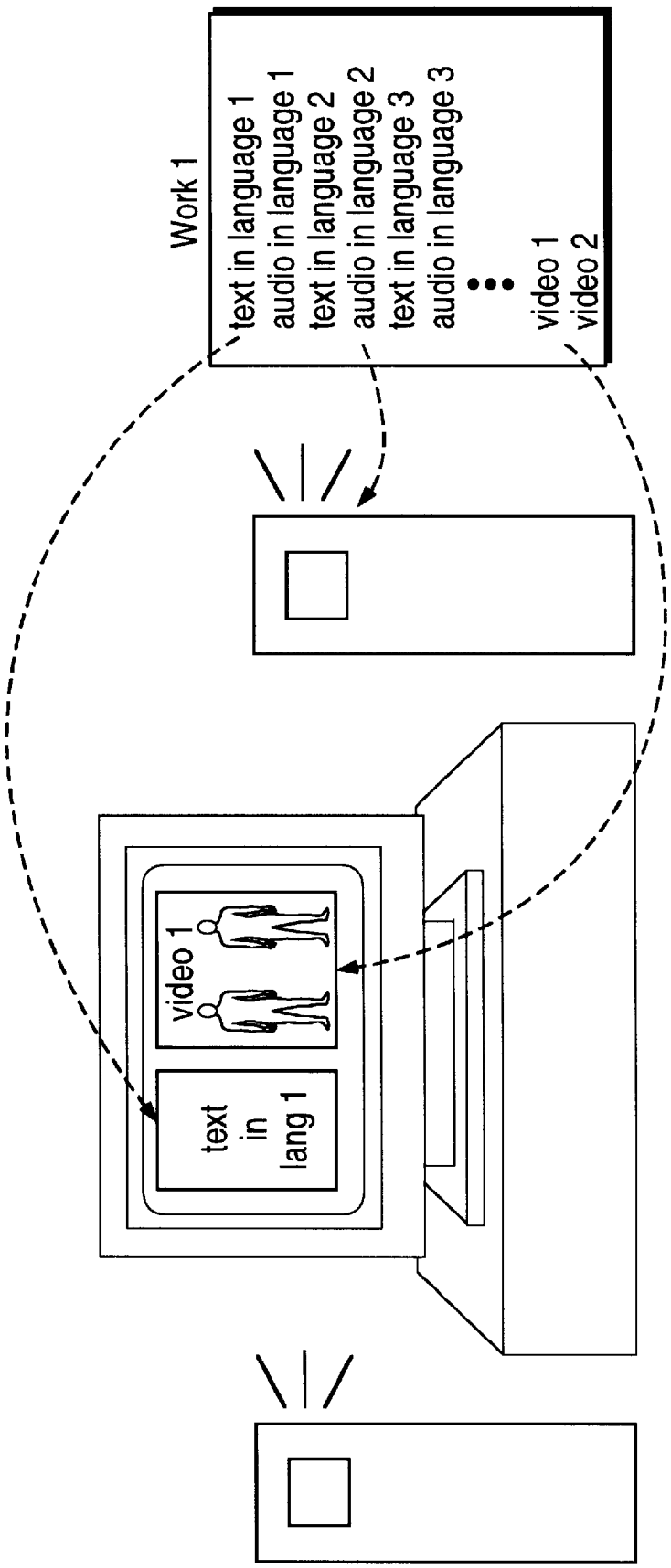
FIG. 5B illustrates a display of the present invention in which a material is presented in a written text of one language, an audio recording of a second language, and a video presentation.

The graphic display and video options available within the database may be developed and used in several different ways. Some users may enjoy having a video to view or create along with a particular document. For example, the written text of a play could be displayed adjacent to a video image of the drama with an accompanying audio narration (See FIG. 5B). The user could then specify the languages of the written text and audio recording. This combination of formats could be particularly helpful to a beginning reader or a beginning language learner in that the action displayed on the video could provide additional contextual clues in deciphering the meaning of the new or unfamiliar language of the accompanying written text. As further review, a user could choose random ordering. Random ordering would allow the selected languages and mediums of a work to be presented in a random order, and would also allow the user to review selections in a random order.

The video option could also provide an educational tool for the hearing impaired reader. For example, a user could access a written document in any given language and also access a sign language video of the same document displayed adjacent to the written text. This combination would function in the same capacity as the written text and audio recording version mentioned above and used by hearing users to facilitate reading or listening to an unfamiliar less known language. However, instead of listening to a familiar language while reading a less familiar language, the hearing impaired user could view a signed version of the material to understand the content of the text of another language.

The database may also be designed to provide cross-links to other relevant material. For example, a user reading a document in a relatively unfamiliar language might find it convenient to be able to easily reference an appropriate foreign language dictionary. Other links to related matter, such as encyclopedia type articles or cross-links on the internet, may present facts on the country of a particular language or tell the history of a particular work, etc. and could also be accessed with benefits to the bilingual or multi-lingual user.

Each of the above described options associated with a foreign language database provide the user with the control to access and create a tool suited for the user's specific needs in dealing with works or projects in another or multiple languages. Whether the use is for an educational, business, or personal purpose, a user interested in bilingual or multi-lingual works or projects can choose the combination of languages that will best suit both the user's purpose, interest, ability, type or level of interaction and engagement.

The advantages of the present invention are numerous. First, a database constructed in the above manner, allowing users to construct multi-lingual documents according to the user's personal needs and interests will dramatically reduce the effort required to create multi-lingual material. Second, the present invention provides a service where a user can find documents translated into multiple languages and create any bilingual or multi-lingual "soft" project (e.g., a book created by the user with options to format and print). This is particularly beneficial to users interested in translations of texts of a work in the less widely used languages. Also, the system can be modified to allow a great deal of user interaction, adjustment, and feedback. Since most users will be accessing the system on their computer where they can download their projects such as a book or work they themselves have created as the system allows for many adjustments—font size, method of comparison in the presentation of textual translations (line-by-line above each other, side-by-side in correlating columns, etc.), video inclusion, audio speed, and volume. Further, the widespread accessibility of a database makes multi-lingual learning and reading an instructive possibility for a wide variety of users. Users will no longer be limited to the few dual translation references found in the user's local library or bookstore in limited quantities, but will now have access through a simple database to most such material available, hard or virtual, and thus also have as resources their own independently created user projects.

We claim:

1. A processing apparatus comprising:
    a database to store a plurality of translated versions of a work in multiple languages in which the translated versions are not literal translations of the work, but are contextual translations to convey contextual meaning of the work across multiple languages; and
    an accessing device coupled to said database to retrieve for presentation any two of said plurality of translated versions of the work to allow comparison to be performed between any two selected languages from the multiple languages.

2. The apparatus of claim 1 wherein the translated versions of the work are presented as written text, audio recording, graphic imagery or video imagery.

3. The apparatus of claim 2 wherein said database is stored on a storage medium and said accessing device is a computer.

4. The apparatus of claim 3 said database is accessible by the computer through a communication link coupled to said storage medium.

5. The apparatus of claim 4 wherein the communication link is a bus, a modem, a network system, or an internet link.

6. The processing apparatus of claim 1 wherein at least one of said translated versions of the work are to be presented as audio recordings and wherein each said translated version includes a plurality of selectable audio recordings options, wherein each said audio recording option has a distinct audio style or speed.

7. The processing apparatus of claim 1 wherein said presentation includes a random presentation order of portions of said translated versions of the work.

8. A computer comprising:
    a database to store a plurality of translated versions of a work in multiple languages in which the translated versions are not literal translations of the work, but are contextual translations to convey contextual meaning of the work across multiple languages; and
    a computer program to retrieve for presentation any two of said plurality of translated versions of the work to allow comparison to be performed between any two selected languages from the multiple languages.

9. The computer of claim 8 wherein the translated versions of the work are presented as written text, audio recording, graphic imagery or video imagery.

10. The computer of claim 9 wherein said database is stored on a storage medium and said database is accessed through a communication link coupled to said storage medium.

11. The method of claim 10 wherein at least one of said translated versions of the work are to be presented as audio recordings and wherein each said translated version includes a plurality of selectable audio recordings options, wherein each said audio recording option has a distinct audio style or speed.

12. The method of claim 10 wherein said presentation includes a random presentation order of portions of said translated versions of the work.

13. A method comprising:
providing a database to store a plurality of translated versions of a work in multiple languages in which the translated versions are not literal translations of the work, but are contextual translations to convey contextual meaning of the work across multiple languages; and
retrieving from the database for presentation any two of said plurality of translated versions of the work to allow comparison to be performed between any two selected languages from the multiple languages.

14. The method of claim 13 further comprising storing the database on a storage medium located at a remote location.

15. The method of claim 13 wherein said retrieving for presentation includes retrieving written text for the translated versions.

16. The method of claim 13 in which said retrieving for presentation includes retrieving translated versions having written text, audio recording, graphic imagery or video imagery.

17. A machine readable medium having resident thereon a set of program instructions to provide a plurality of translated versions of a work, the program instructions when executed by a processor cause the processor to perform comprising:
accessing a database having stored therein translated versions of a work in multiple languages in which the translated versions are not literal translations of the work, but are contextual translations to convey contextual meaning of the work across multiple languages;
retrieving from the database for presentation any two of said plurality of translated versions of the work to allow comparison to be performed between any two selected languages from the multiple languages.

18. The machine readable medium of claim 17 wherein said accessing the database accesses it on a storage medium located at a remote location.

19. The machine readable medium of claim 17 wherein said retrieving for presentation includes retrieving written text for the translated versions.

20. The machine readable medium of claim 17 in which said retrieving for presentation includes retrieving translated versions having written text, audio recording, graphic imagery or video imagery.

* * * * *